Figure 1:
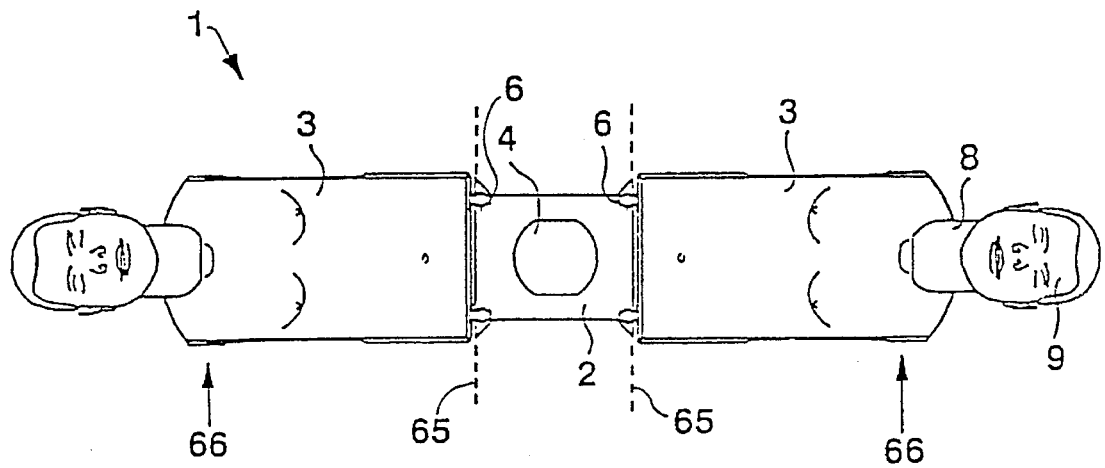

United States Patent [19]
Kohnke

[11] Patent Number: 5,593,306
[45] Date of Patent: Jan. 14, 1997

[54] MANIKIN UNIT

[75] Inventor: Ole B. Kohnke, Lyngby, Denmark

[73] Assignee: Ambu International A/S, Glostrup, Denmark

[21] Appl. No.: 544,888

[22] Filed: Oct. 18, 1995

[30] Foreign Application Priority Data

Oct. 19, 1994 [DK] Denmark .................................. 1209/94

[51] Int. Cl.[6] .................................................. G09B 23/32
[52] U.S. Cl. ............................................ 434/267; 434/265
[58] Field of Search .................................. 434/262, 265, 434/267

[56] References Cited

U.S. PATENT DOCUMENTS

| | | | |
|---|---|---|---|
| 3,010,223 | 11/1961 | Alderson | 434/267 |
| 3,209,409 | 10/1965 | James | 434/265 |
| 4,850,876 | 7/1989 | Lutaenko et al. | 434/265 |
| 4,938,696 | 7/1990 | Foster et al. | 434/267 |
| 5,018,977 | 5/1991 | Wiley et al. | 434/267 |
| 5,055,052 | 10/1991 | Johnsen | 434/265 |
| 5,195,896 | 3/1993 | Sweeney et al. | 434/265 |
| 5,238,409 | 8/1993 | Brault et al. | 434/267 |
| 5,295,835 | 3/1994 | Scheinberg | 404/265 |
| 5,423,685 | 6/1995 | Adamson et al. | 434/265 |

*Primary Examiner*—Paul J. Hirsch
*Attorney, Agent, or Firm*—Thomas R. Vigil

[57] ABSTRACT

A manikin unit (1) for teaching cardio-pulmonary resuscitation (CPR) techniques, including ventilation and external cardiac massage, comprises at least one manikin (66) and a chest extension structure (2). The manikin comprises a head (9) having a mouth opening, a neck (8), a chest means (3), a throat means in communication with the mouth opening, and a lung means in communication with the throat means, the chest means comprising a flexible front plate formed to imitate the human chest, a back plate and a resilient compression means compressed between said front plate and said back plate. According to the invention the chest extension structure (3) is connected to said chest means' distal end by means allowing it to pivot about a pivot axis extending in a direction transversely to the chest means between an in-use position wherein the chest extension structure extends longitudinally from the chest means and serves to stabilise the manikin, and a storage position wherein the chest extension structure is pivoted away from the in-use position in order to reduce the length of space occupied by the manikin unit.

10 Claims, 4 Drawing Sheets

MANIKIN UNIT

This invention relates to a manikin unit intended to be used as a tool for teaching cardio-pulmonary resuscitation techniques (CPR), i.e. artificial respiration and cardiac massage.

A manikin for teaching CFR and comprising a chest, a neck and a head which is pivotable relative to the neck, and wherein the chest region of the manikin is provided with a compressible cardiac massage means and an airproof bag to simulate a lung function, said bag extending through the neck and being in communication with the head in such a manner that the bag interior is in open communication with the surroundings through an opening in the head's face cover, is described in i.a. EP-A-93200624 and U.S. Pat. No. 4,984,987.

In order to make the instruction more realistic, the manikin must be of a size which is close to the average, grown man and corresponds at least to his head and chest. Owing to the limitations in the space available during the instruction and transport, however, the manikin does not usually comprise portions which correspond to the lower part of the body and lower extremities.

Manipulation during the instruction may give rise to sliding, rolling and yawing movements of the manikin. In the interest of creating a training situation which closely ressembles a real-life situation, the manikin should be movable to some extent and therefore, it is not acceptable to fix the manikin. On the other hand, if the manikin is short and constructed of light-weight materials, it is difficult to obtain sufficient stability for making the training situation realistic.

However, in order to facilitate transportation and handling, the manikin for teaching resuscitation techniques is usually made of comparatively light materials. Consequently the stability of such manikins during use is relatively poor which means that there is a risk of the user of such manikin exerting such influence thereon that unintentional movement of the manikin results.

One solution would be to stabilise the manikin by making it longer which would, however, be detrimental from a transportation and storing point of view and inconvenient when instruction is carried out in classrooms where there is a need for simultaneous use of a number of manikins.

It is the object of the invention to provide a manikin unit of the type described in the introductory part which is more compact and thus easier to handle, to store and to transport compared to the state-of-the-art manikin.

It is a further object of the invention to provide a manikin unit which exhibits a stability suitable for creating a realistic training situation.

It is a still further object of the invention to provide a manikin unit which permits very effective utilization of space in the training situation.

It is yet another object of the invention to provide a manikin which is easily converted from a storage position to an in-use position and vice-versa.

This is achieved with the manikin unit according to the invention which is adapted for being arranged flat on a substantially horizontal surface and comprising at least one manikin and a chest extension structure, said manikin comprising a head means having a mouth opening, a neck means connected to said head means, a chest means having a proximal and a distal end and connected by said proximal end to said neck means, a throat means in communication with said mouth opening, and a lung means in communication with said throat means, said chest means comprising a flexible front plate formed to-imitate the human chest, a back plate and a resilient compression means compressed between said front plate and said back plate to provide a biasing force between said plates, and said chest extension structure being connected to said chest means' distal end by a pivot means allowing it to pivot about an pivot axis extending in a direction transversely to said chest means between an in-use position wherein said chest extension structure extends longitudinally from said chest means and serves to stabilise the manikin against rolling and yawing motions otherwise likely to be provoked during use, and a storage position wherein the chest extension structure is pivoted away from the in-use position in order to reduce the length of space occupied by the manikin unit.

During use, the manikin unit according to the invention is arranged on a horisontal support with the chest means and the chest extension structure arranged generally horisontally. Following use, the chest extension structure is pivoted approximately 90° relative to the chest means into the storage position wherein the manikin may conveniently be stored and transported.

A preferred embodiment is characterized by said chest extension structure being provided with a first and a second pivot means defining a first and second pivot axis, each of said pivot means providing a pivotable connection to a chest means of a respective manikin, and preferably by said chest extension structure being provided with said first and second pivot means in an arrangement where said first and second pivot axis are mutually spaced to a distance where each of said chest means may pivot through approximately 90° from an in-use position to a storage position wherein both of said chest means extend generally parallel to oneanother.

In this embodiment the chest means may be arranged either back to back or chest to chest. The unit thus folded forms a balanced package which may be lifted and transported in a handle provided in or mounted on the chest extension structure.

This allows for more compact packaging integrally in one unit of a number of manikins during storage and for more effective utilization of space during use compared to the situation when the manikins are separate objects. When the manikin unit is unfolded into the in-use position, the manikins of the unit stabilise eachother in a very convenient manner.

Thus, during the inevitable influence of forces onto the manikin in the training situation, the manikin which is part of the unit according to the invention will be stabilised by the protruding chest extension means and it will thus be far more stable than a conventional short manikin with the same weight.

A preferred embodiment is characterized in that the head is detachable and the neck pivotable relative to the chest, and that the chest is so designed that the detached head and neck portions may be received by and secured in the interior of the chest.

This embodiment of the invention is based on the discovery that the packaging volume of the unit may be reduced further by detaching the heads and, optionally, the necks and arranging them interiorly of the respective chests which are sufficiently voluminous to contain them.

The unit according to preferred embodiments of the invention may comprise two, three or four manikins. In embodiments of the unit comprising two or four chest means the chest extension structure is preferably provided in the form of a substantially rectangular or square structure or plate. In an embodiment of the unit comprising three manikins, the chest extension structure is preferably provided in the form of a substantially triangular structure or plate. The extension structure plate is preferably provided with stands.

Preferably, the chest extension structure comprises a handle for carrying the unit. When the chest extension structure is in the form of a plate, said handle may be realised by providing an opening in the plate, the edge of which may be gripped by fingers.

Preferably, the chest means is secured to the chest extension structure by pivots. Alternatively the pivotable connection of the chest means to the chest extension structure may be effected by means of flexible straps.

Preferably, the chest means may pivot 90° about a pivot axis which extends perpendicular to the longitudinal axis of the chest means at the point where the chest means is secured to the chest extension structure.

In the two extreme positions for the said 90° pivoting, the longitudinal axes of the chest means are disposed in a plane parallel with the plane of the chest extension structure and perpendicular to the plane of the chest extension structure, respectively. Herein, the first-mentioned position is designated the in-use position while the latter position is designated the storage position.

A preferred embodiment of the invention is characterised in that the head is detachable from the neck, that the distal end of the neck is pivotably secured to the proximal end of the chest means, and that the chest means is so designed that the neck may be pivoted into the interior of the chest means.

Herein the term proximal refers to parts closer to the head whereas the term distal refers to parts more remote from the head. The part of the head adjacent to the neck is referred to as the lower end of the head.

In another embodiment, the head as well as the neck may be detached and arranged in the interior of the chest, together or separately.

Preferably the detached elements may be secured in their positions inside the chest, e.g. by snap-locking them into place.

The neck interior is preferably provided with an adapter with means for connection to a neck of the airproof bag. Said adapter may e.g. comprise a tubular piece. Preferably, the head comprises at its lower end a protruding pipe spigot with means for being secured to the neck.

Said securing means may e.g. be in the form of a socket for receiving a corresponding pipe spigot and provided with a fastener clip which may be caused to engage with said spigot and to maintain the latter in engagement. Such securing means is usually designated a snap-locking arragement. Examples of alternative suitable securing means include other types of snap-locking arrangements.

The cardiac massage means are preferably in the form of an inflated bellows or spring, e.g. a compression spring or a coil spring. Preferably, the chest comprises an anatomically shaped hull made of a flexible material, such as a thermoplastic elastomer or the like, e.g. polyethylene.

The airproof bag preferably consists of a welded plastics film of e.g. polyvinylchloride or polyethylene. The bag may be attached to both sides of the chest with the purpose that the sides of the chest will be pulled inwardly upon inflation of the bag and will drive the chest central portion upwardly to simulate chest heaving.

Figure 2:
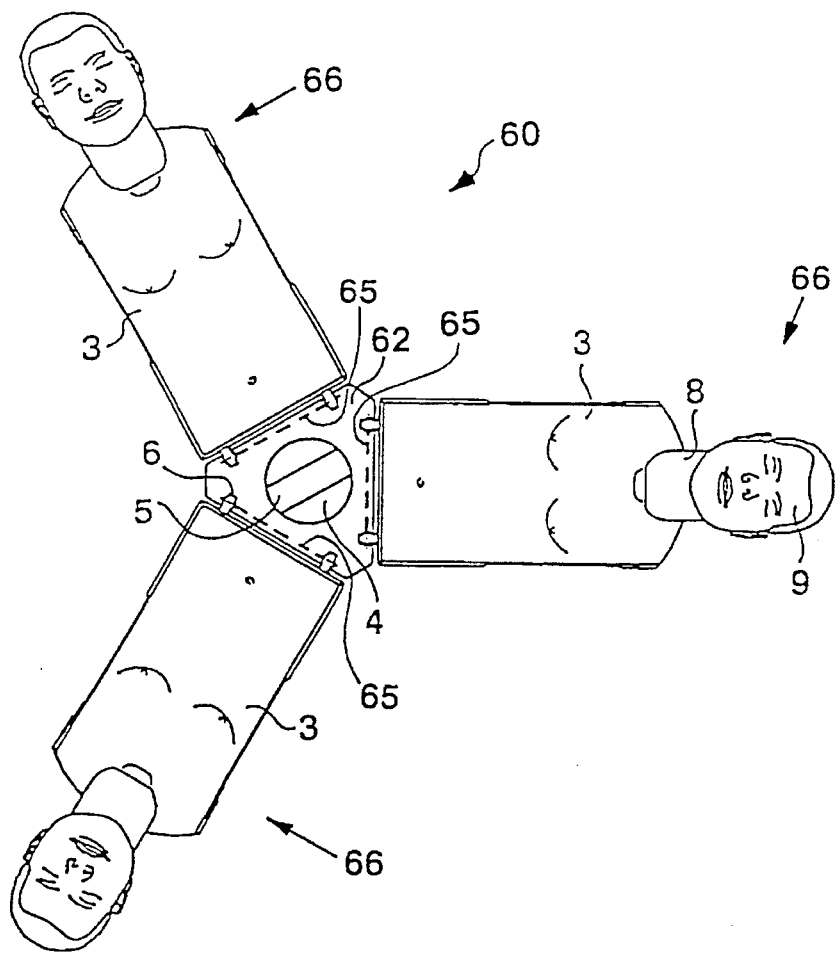
Figure 3:
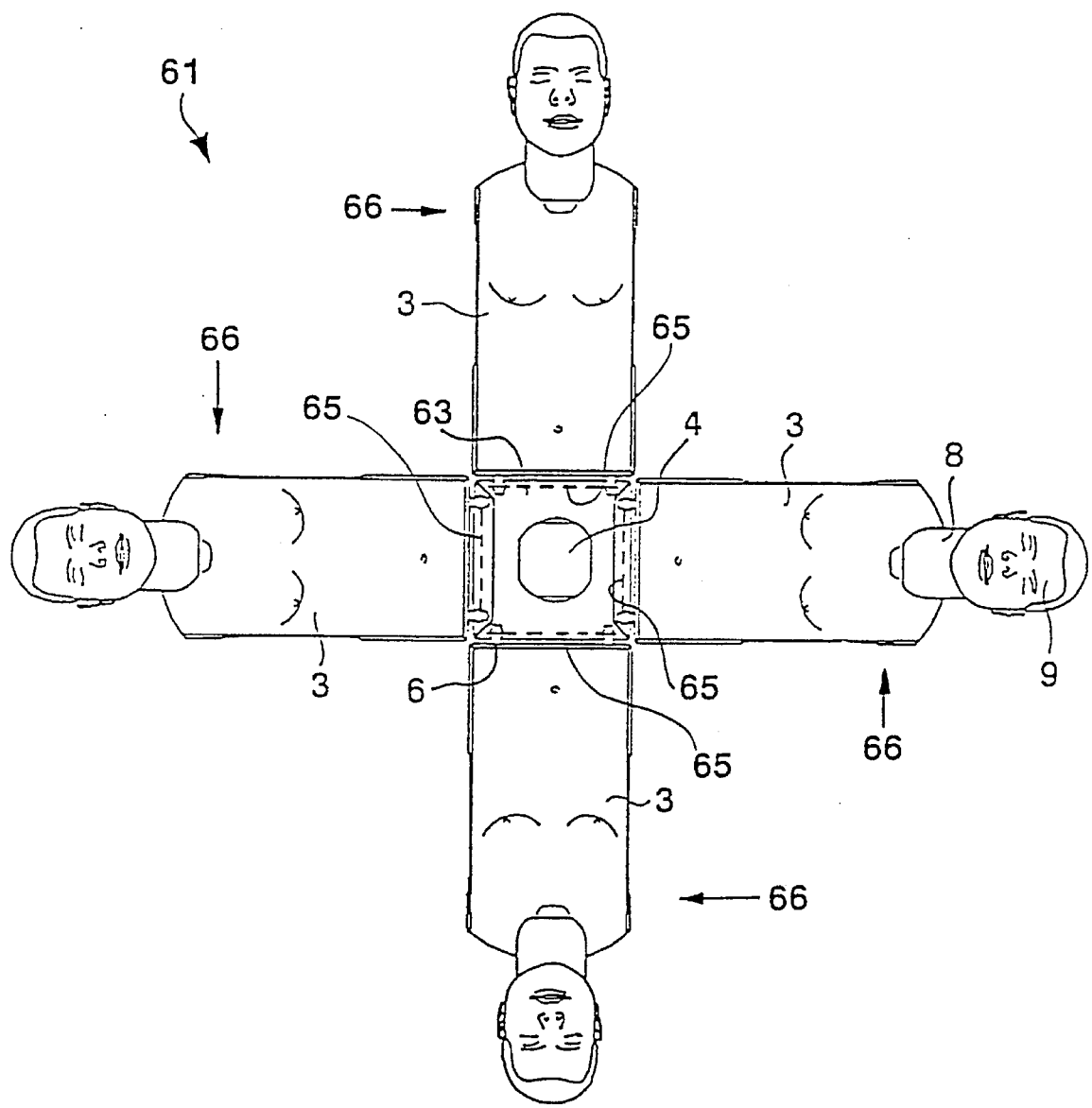
Figure 4:
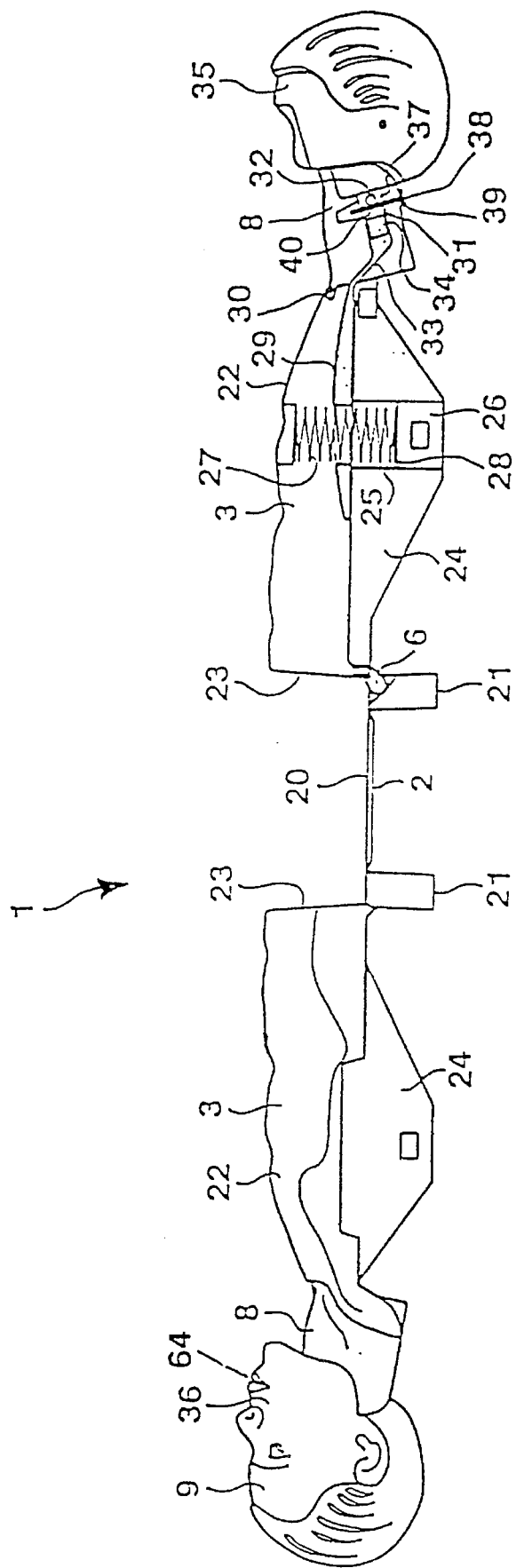
Figure 5:
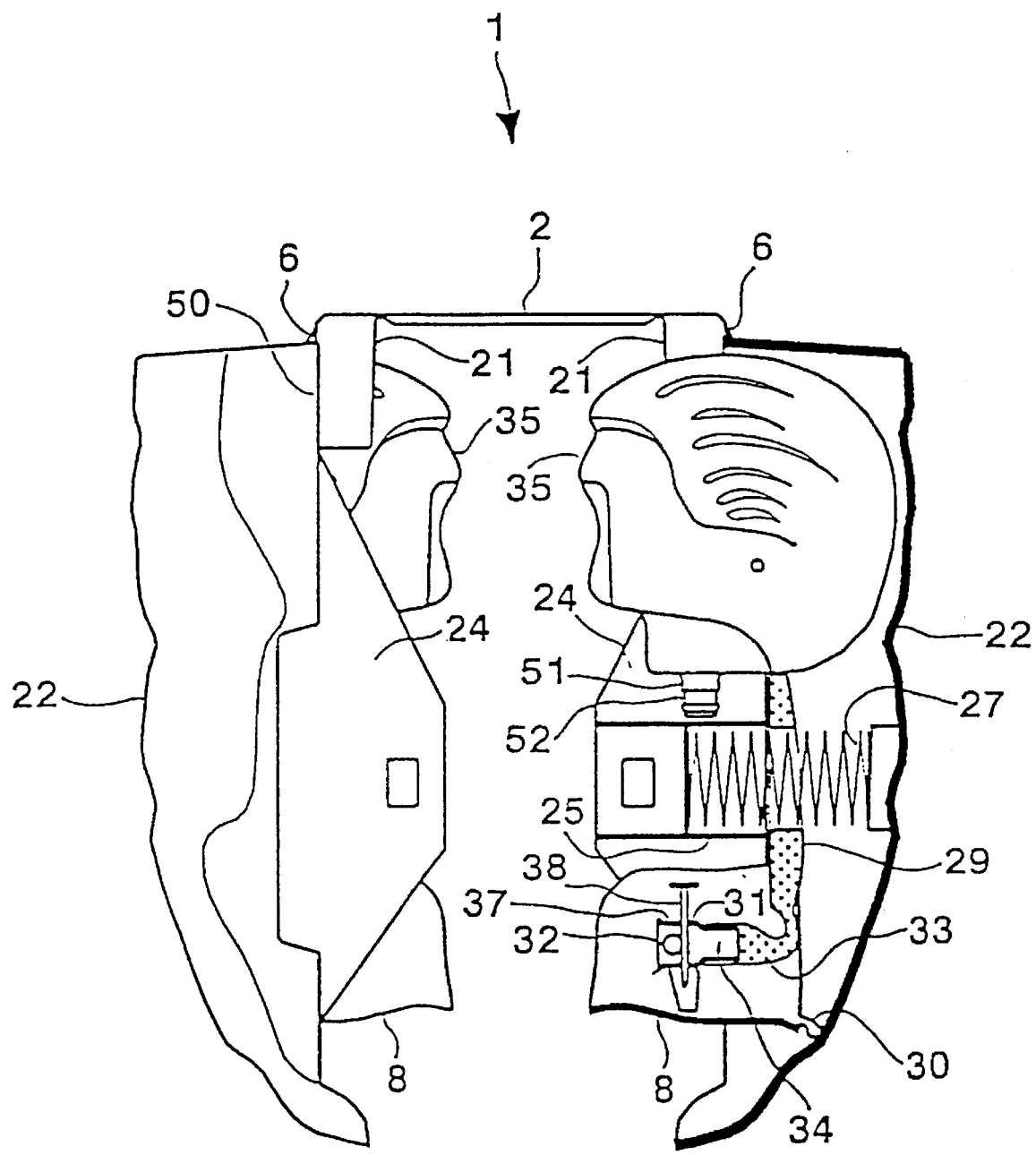

The invention will be more fully understood from the following detailed description of preferred embodiments which is given with-reference to the drawings, wherein FIG. 1 is a top plan view of a unit according to a first embodiment of the invention with two manikins in their in-use positions, FIG. 2 is a top plan view of a unit according to a second embodiment of the invention with three manikins in their in-use positions, FIG. 3 is a top plan view of a unit according to a third embodiment of the invention with four manikins in their in-use positions, FIG. 4 is a side elevational view of the unit according to the first embodiment of the invention in its in-use position, and wherein the chest and the neck of one of the manikins is shown in a longitudinal, sectional view, and FIG. 5 shows the unit illustrated in FIG. 4 in its storage position.

All the figures are schematic sketches illustrating only parts essential for clarifying the principles underlying the unit according to the invention, other parts being omitted from the drawings for the sake of clarity. The drawings are not necessarily to scale. Throughout the description identical reference numerals are used for identical or similar elements.

In FIG. 1 a unit 1 according to a first embodiment is illustrated which comprises a chest extension structure 2 and two manikins 66 connected to the chest extension structure by pivot means 6 to allow them to pivot about respective axes 65. Each of the manikins 66 generally comprises a head 9, a neck 8 and a chest means 3. The chest extension structure 2 is in the form of a substantially rectangular plate wherein an opening 4 is provided defined by an edge which may be used as a handle for carrying the unit 1.

The unit according to this embodiment may be modified into a unit comprising just one manikin connected to the chest extension structure by merely detaching the pivot connections to the other manikin and removing the other manikin. This modification is considered obvious and therefore no separate illustration is given.

FIG. 2 illustrates a unit 60 according to a second embodiment of the invention and comprising a chest extension structure 62 according to a second embodiment hereof and three manikins which are pivotable about respective axes 65. This embodiment of the chest extension structure 62 is in the form of a triangular plate with cut-off corners and having a circular opening 4. Across the circular opening 4 and through its center, a handle bar 5 is mounted that serves as a handle for carrying the unit 1.

FIG. 3 illustrates a unit 61 according to a third embodiment of the invention and comprising a chest extension structure 63 according to a third embodiment hereof and four manikins which are pivotable about respective axes 65. This embodiment of the chest extension structure 63 is in the form of a square plate with an opening 4.

The chest means 3 of the manikins illustrated in FIGS. 1 through 3 are all secured to the respective chest extension structures 2,62,63 by means of pivots 6 and each of the manikins is further provided with a neck 8 and a head 9.

FIG. 4 illustrates the unit 1 according to the first embodiment and comprising a chest extension structure 2 and two manikins. The chest extension structure 2 comprises a rectangular plate 20 and a stand 21 comprising four legs arranged at the respective corners of the plate 20.

The chest means 3 is secured to the chest extension structure 2 by means of pivots 6 and each chest is provided with a neck 8 and a head 9. The chest means 3 comprises an anatomically shaped hull 22 af a flexible plastics materiale, e.g. polyethylene, a transverse wall 23 and two side walls 24 which taper downwardly and which, seen from the side edges of the hull 22, inclines towards the centre of the chest 3 where they meet in a centrally arranged, vertical tubular casing 25 provided with a bottom piece 26. When arranged flat on its back, the manikin abuts on the support at the bottom 26, the stand 21 and at the back of its head. This combined abutment ensures stable positioning thereof during use.

The interior of the tubular casing 25 is provided with a compression spring 27 for cardiac massage instruction, said spring 27 resting on the spring base 28 of the bottom piece 26. The side walls 24 and the tubular casing 25 are moulded in one piece and are made of a rigid thermoplastic material, e.g. polypropylene.

Moreover, in the interior of the chest 3 an airproof lung means 29 is arranged in the form of a bag which is made of a welded plastics film of e.g. polyethylene. The bag 29 is suspended in the sides of the hull 22 in such a manner that it will pull said sides together upon inflation and thus effect heaving of the intermediate portion of the hull 22. The bag 29 comprises an opening through which the spring 27 is arranged.

A hinge 30 secures the neck 8 at its distal end to the center of the proximal end of the hull 22 in the clavicle region.

The neck 8 is provided with an adapter 31 which is suspended in the neck wall by means of two pivots 32 in such a manner that the head 9 is pivotable relative to the neck 8.

A neck portion 33 of the bag 29 is introduced into the neck 8 interior and sealingly mounted to an end of the adapter 31 which is in the form of a connecting pipe 34.

The head 9 consists of a head piece 35 and a detachable face cover 36.

The lower end of the head piece 35 abuts on the proximal end of the neck 8. At its lower end, the head piece 35 comprises a pipe spigot 51 (cf. FIG. 5) which is in communication with the surroundings through a throat means in the form of an internal duct (not shown) in the head piece 35 via a mouth opening 64 in the face cover 36. The construction of the internal duct is considered to be obvious to the skilled person and therefore it will not be subject to more detailed description herein.

The head piece 35 pipe spigot 51 which comprises an external annular groove 52 (cf. FIG. 5) is introduced into the proximal end of the adapter 31 which is provided in the form of a socket 37 matched to fit and hold the spigot.

Once the socket 37 and the pipe spigot 51 of the head piece 35 are caused to engage with eachother, they are secured by means of a resilient U-shaped fastener clip, the two leg portions 40 of which are disposed in slots provided at opposite sides of the socket in such a manner that said legs form secants to the circular cross section of the socket 37. The U-shaped clip is accessible from the outside through an opening in the neck wall.

The head piece 35 is secured to the neck 8 by introducing the pipe spigot 51 into the socket 37 whereby the legs 40 of the resilient U-shaped clip 38 will initially be urged apart and subsequently flex back into the recess 52 of the pipe spigot 51 and thus secure the head piece 35 in this position.

In order to switch the manikin from its in-use position to its storage position, the head piece 35 is detached at the neck 8 by exerting from the outside of the neck 8 a pressure onto the arched bridge portion 39 of the clip 38, whose legs 40 may subsequently be moved apart and out of the recess 52 in the pipe spigot 51 of the head piece 35.

Upon being detached from the neck 8, the head piece 35 is arranged in the interior of the chest 3 in a space which is delimited by the hull 22, the tubular casing 25 with the spring 27, the transverse wall 23 and the side walls 24. The tapering, sloping side walls 24 and the head piece 35 is so constructed that the head piece may be snapped into and held in position in said space.

The hinge 30 allows the neck 8 to be pivoted 90° relative to the chest 3 in such a manner that the neck 8 is located inside the chest 3. The bag 29 adapts to this pivoting by folding.

Finally, the pivots 6 allow each of the two chest means 3 to be pivoted 90° relative to the chest extension structure in such a manner that the side walls 24 of the two chests are located adjacent to eachother. This position is shown in FIG. 5.

In the storage position, the back side of the chest means' 3 distal portion 50 abuts on the legs of the stand 21 and prevents further pivoting of the chest means 3. The pivot axes of the chest extension structure are conveniently spaced sufficiently apart to allow each of the two chest means 3 to pivot 90° until they are substantially parallel without colliding. The manikin unit is switched from storage position to in-use position by carrying out the corresponding steps in reversed order.

The switching procedures applicable to either of the alternative embodiments are similar to what is described above for the first embodiment.

It is to be understood that, although a specific embodiment of the invention has been described above, it serves only to exemplify and illustrate the invention and is not intended to limit the scope thereof, which is exclusively defined by the appended claims. Although various components have been described herein in a specific context, this does not preclude the individual components from being suitable in other combinations and possibly from being independently patentable.

REFERENCE NUMERALS

1. Manikin unit, first embodiment
2. Chest extension structure, first embodiment
3. Chest means
4. Opening
5. Handle bar
6. Pivots
7.
8. Neck
9. Head
10.
11.
12.
13.
14.
15.
16.
17.
18.
19.
20. Plate
21. Stand
22. Hull
23. Transverse wall
24. Side walls
25. Tubular casing
26. Bottom piece
27. Compression spring
28. Spring base
29. Bag (lung means)
30. Pivot
31. Adapter (throat means)
32. Pivot
33. Neck portion of bag
34. Connecting pipe (adapter spigot)
35. Head piece
36. Face-cover
37. Socket
38. U-shaped fastener clip 39. Bridge portion
40. Leg portion
41.
42.
43.
44.
45.
46.
47.
48.
49.
50. Chest means distal portion
51. Pipe spigot
52. Annular groove
53.
54.
55.
56.
57.
58.
59.
60. Manikin unit, second embodiment
61. Manikin unit, third embodiment
62. Chest extension structure, second embodiment
63. Chest extension structure, third embodiment
64. Mouth opening
65. Pivot axis
66. Manikin

I claim:

1. A manikin unit for teaching cardio-pulmonary resuscitation (CPR) techniques, including ventilation and external cardiac massage, said unit being adapted for being arranged flat on a substantially horizontal surface and comprising a first manikin and a second manikin and a chest extension structure, each of said manikins respectively comprising a head means having a mouth opening, a neck means connected to said head means, a throat means in communication with said mouth opening, a lung means in communication with said throat means, and a chest means having a proximal and a distal end and connected by said proximal end to said neck means, said chest means comprising a flexible front plate formed to imitate the human chest, a back plate and a resilient compression means arranged between said front plate and said back plate and adapted to provide a force counteracting compression of said plates, said chest extension structure being provided with a first pivot means and a second pivot means defining, respectively, a first pivot axis and a second pivot axis, the chest means of said first manikin being pivotably connected by said first manikin chest means' distal end to said first pivot means with said first pivot axis extending in a direction transversely to said first manikin chest means, and the chest means of said second manikin being pivotably connected by said second manikin chest means' distal end to said second pivot means with said second pivot axis extending in a direction transversely to said second manikin chest means, whereby said first and said second chest means may pivot relative to said chest extension structure between an in-use position wherein said first and said second chest means may be arranged flat on a common, substantially horizontal surface and a storage position wherein said first and said second chest means extend generally parallel to one another.

2. A manikin unit according to claim 1, characterized by said chest extension strucure being provided with a stand adapted for supporting said chest extension structure on said substantially horizontal supporting surface.

3. A manikin unit according to claim 1, characterized by said chest extension structure further being provided with third pivot means defining a third pivot axis, a chest means of a third manikin being connected to pivot about said third pivot axis.

4. A manikin unit according to claim 1, characterized by said chest extension structure a fourth pivot axis, a chest means of a fourth manikin being connected to pivot about said fourth pivot axis.

5. A manikin unit according to claim 1, characterized by said manikin neck means being pivotably connected to said manikin chest means' proximal end and adapted to pivot between an in-use position wherein said neck means extends generally longitudinally of said manikin chest means, and a storage position wherein said manikin neck means is pivoted away from the in-use position in order to reduce the length of space occupied by said manikin unit.

6. A manikin unit according to claim 1, characterized by said manikin head means being detachable from said manikin neck means and said manikin chest means being adapted for receiving and holding said manikin head means when detached and while said manikin chest extension structure and said manikin neck means are pivoted to their respective storage positions.

7. A manikin unit according to claim 1, characterized by said chest extension structure being provided with means forming a handle adapted for being used for carrying said manikin unit while said respective chest extension structures, said respective neck means and said respective head are all arranged in their respective storage positions.

8. A manikin unit according to claim 1, characterized by said manikin chest means being adapted for securing said manikin head means and said manikin neck means when arranged in their respective storage positions.

9. A manikin unit according to claim 1, characterized by said manikin neck means being provided internally with an adapter with means for connection to a neck portion of said bag.

10. A manikin unit according to claim 1, characterized by said manikin head means comprising a pipe spigot and by said manikin neck means comprising a socket adapted for matingly receiving said pipe spigot and provided with a releasable fastener means adapted for securing said spigot in said socket to maintain the mutual engagement.

* * * * *